United States Patent Office 3,512,976
Patented May 19, 1970

3,512,976

AMMONIUM AND METAL SULFITES AS STABILIZERS OF LIGHT SENSITIVE SYSTEMS

Yoshikazu Yamada, Sierra Madre, and Thomas H. Garland, El Monte, Calif., assignors to Bell & Howell Company, Chicago, Ill., a corporation of Illinois No Drawing. Filed July 21, 1966, Ser. No. 566,728
Int. Cl. G03c 5/24
U.S. Cl. 96—48 12 Claims

ABSTRACT OF THE DISCLOSURE

A process for stabilizing a photographic image formed by image-wise exposure to actinic light of a photosensitive combination of an organic halogen compound and an aromatic nitrogen atom-containing compound, whereby the background and image areas are stabilized by the application of a compound having the formula $$M_{3-v-w}(H)_wS_{1+x}O_{3+2x}$$

wherein $x$ is selected from 0 and 1, M is a cation selected from ammonium, alkali metals and alkaline earth metals, $v$ is the valence of said selected cation, and $w$ is 0 when $v$ is 2 and is selected from 0 and 1 when $v$ is 1.

This invention relates to photosensitive compositions, films or articles and to improved stabilization methods relating thereto. In particular, this invention relates to a method of stabilizing or fixing images obtained with organic photosensitive compositions.

In general, it is old and well known in the photographic arts to provide photographic systems involving two or more organic materials which react under the influence of actinic light to produce a color. As early as 1921, Murray C. Beebe and his coworkers described numerous organic photographic systems (e.g., U.S. Pats. Nos. 1,574,357; 1,574,358; 1,574,359; 1,575,143; 1,583,519; 1,587,269; 1,587,270; 1,587,271; 1,587,272; 1,587,273; 1,587,274; 1,604,674; 1,618,505; 1,655,127; 1,658,510; and 1,820,593). Generally, these systems relate to the use of various halogen compounds (e.g., iodoform and others) in combination with a second ingredient, in which Beebe and subsequent workers have theorized that light effects the release of a radical from the halogen compound which carries out a color-forming reaction with the second compound. Subsequent workers such as Eugene Wainer (e.g., U.S. Pats. Nos. 3,042,515; 3,042,516; 3,042,517; 3,042,518; 3,042,519; 3,046,125; and 3,056,673) and Robert Sprague (U.S. Pat. No. 3,082,086), as well as a number of other workers since the time of Beebe, have continued the development of various photographic systems involving a photo-energized reaction of a combination of a halogen-containing compound and one or more other compounds. Other recent disclosures include British Pat. No. 917,919 and Belgian Pat. No. 596,094.

More recently, it has been discovered that incorporation of certain of the above combinations as dispersions in a continuous phase, e.g., gelatin, in which such combinations are substantially insoluble, results in a photographic composition of superior speed, sensitivity and other properties. This discovery has been described in our application, Ser. No. 481,759, filed Aug. 23, 1965, entitled "Production and Use of Photosensitive Compositions and Films." In that application, it is explained that the selection of an aromatic N-containing compound as there described merely for its ability to form some sort of color with a halogen-containing compound under the influence of actinic light is a practical minimum for purposes of demonstrating the invention.

A drawback of exposed films incorporating the above compositions is their tendency to darken upon prolonged exposure to light. It is an object of this invention to provide a method of stabilizing exposed photographic compositions which utilize the organic photosensitive combinations described above. It is a further object to stabilize compositions which comprise a dispersion of an organic halogen compound and a second ingredient. It is a particular object to provide a method for stabilizing such photographic compositions wherein a combination of organic halogen and nitrogen-containing compounds are dispersed in a non-solubilizing continuous phase. It is a still further object to provide a method wherein a photographic image is effectively stabilized against darkening of background areas and can be used repeatedly as a master in diazo and other reproduction processes involving repetitious exposure to light of any wavelength. Other and further objects, features and advantages of this invention will become apparent from the following description thereof.

Thus, this invention relates to a process in which a photographic image is formed by exposure to actinic light of a photosensitive combination of at least two starting agents, one of which is an organic halogen compound; and the above objects and others are accomplished by providing an improvement whereby light sensitive areas remaining after formation of the image are desensitized, which improvement comprises subjecting such areas to a desensitizing amount of a compound having the formula $M_{3-v-w}(H)_wS_{1+x}O_{3+2x}$ wherein $x$ is selected from 0 and 1, M is a cation selected from ammonium, alkali metals and alkaline earth metals, $v$ is the valence of the selected cation, and $w$ is 0 when $v$ is 2 and is selected from 0 and 1 when $v$ is 1. The cation chosen should be such that the compound is soluble in any particular solution used, e.g., acetone, water, etc.

Examples of suitable desensitizing compounds include ammonium sulfite, lithium sulfite, sodium sulfite, potassium sulfite, magnesium sulfite, potassium metabisulfite, sodium metabisulfite, ammonium bisulfite, potassium bisulfite and sodium bisulfite. The exposed film may be dipped into a solution, preferably aqueous, of one or more of the above compounds or it may be sprayed or wiped with the solution. In this latter case, the solution may contain a thickener such as polyvinyl alcohol or carboxymethylcellulose.

In general, any amount of the desensitizing compound will diminish background darkening of the image; a practical upper limit is about 15 weight percent of the aqueous solution and generally about 0.1 weight percent will noticeably prevent such darkening. A preferred range is from about 0.5 to about 10 weight percent. When dipping the exposed film into a bath containing the desensitizer, immersion for from about 30 seconds to about 5 minutes is generally satisfactory.

In a negative-working system the photosensitive film is subjected to actinic light in an image-wise projection (or exposure) wherein light is projected through the transparent or translucent areas of the original image to corresponding areas which are "light struck" on the photosensitive film; and these light struck areas ultimately appear as the darker colored areas either as a result of direct print-out by the projected actinic light or as a result of subsequent heating or other treatment. The areas that are not "light struck" during the image-wise initial exposure retain their photosensitivity (as in the case of non-light-struck silver halide areas in silver photography). The instant invention provides a method of desensitizing these areas so that they will not later develop or otherwise impair the desired image on the film during storage or subsequent use.

When the photographic combination is dispersed in a non-solubilizing continuous phase, as in our above-noted prior applications, the photosensitive non-light-struck combinations are particularly difficult to desensitize. In these films, the photosensitive material is "encapsulated," that is dispersed in clusters or globules, and desensitization involves penetration of the continuous phase to react with, neutralize or otherwise nullify photosensitivity of the non-light-struck material; and the penetrating desensitizer must not adversely affect the image. These problems have been effectively overcome by our invention.

A particularly important use involved in the practice of the instant invention is in the diazo reproduction system. In such a system, a so-called diazo master or intermediate is prepared, by a negative-working mode, and this diazo intermediate is employed in conjunction with actinic near ultraviolet light to produce a succession of prints on diazo paper. In this use the diazo intermediate is subjected to repeated exposures of actinic near ultraviolet light and the instant invention provides a method for desensitizing previously unexposed areas of the diazo intermediate such that they will not develop or darken during such repeated exposure.

In a preferred embodiment of our invention, the photosensitive combination comprises at least two starting agents, (a) and (b), one of which, (b), is an organic halogen compound. In other preferred embodiments, the other starting agent, (a), is a nitrogen atom-containing compound having certain structural characteristics. Thus, our process is particularly suitable when the nitrogen atom-containing compound used in the photosensitive combination has a nitrogen atom attached directly to at least one benzene ring, said benzene ring being free from carbon atom substitution in the position para to said nitrogen atom attachment. Our process is also particularly suitable with nitrogen atom-containing compounds in which the nitrogen atom is a member of a heterocyclic ring. Still another type of nitrogen atom-containing compound with which our process is particularly useful is an N-vinyl compound.

It will be appreciated that there is substantial overlap between the above types of nitrogen-containing compounds and that our process is useful with photosensitive combinations that are formulated with nitrogen atom-containing compounds falling within one, two or even all three of the above terms; e.g., N-vinylcarbazole. It will also be appreciated that there is no generic term available in accepted chemical terminology that will effectively embrace all of the above type of nitrogen atom-containing compounds. It is merely important to note that photosensitive combinations containing a compound which has at least one of the above characteristics can be readily desensitized by the process of this invention. Photosensitive combinations containing compounds having more than one of the above characteristics lend themselves even better to our process. Examples of particularly effective nitrogen atom-containing compounds include N-vinylcarbazole, N-ethylcarbazole, indole and diphenylamine.

In another embodiment of this invention, the combinations desensitized by our process are dispersed in the form of discrete globules in a continuous water-penetrable phase in which the combination is substantially insoluble. Such dispersions are discussed in detail in our above-mentioned prior applications. Generally, the solid-film-forming component used to achieve a continuous phase may be any of a number of generally photographically inert materials, which are, in most cases, soluble in water or so finely dispersible therein in the concentrations of use that for practical purposes there is no distinction between solution and dispersion for these materials in the continuous phase. Such materials include the starch and starch derivatives, proteins (i.e., casein, zein, gelatin, thiolated gelatin, etc.) alignates, gums, and the like materials which are generally considered to be natural derivatives of natural film-forming materials, any one of which in its conventional "water-soluble" form is used in the practice of the instant invention. In addition, synthetic water-soluble film-formers may also be used to particular advantage in the practice of the invention and such materials include polyvinyl alcohol, commercially available water-soluble polyacrylics or acrylates (i.e., water-soluble polyacrylic acid salts having substantially the molecular weight and water compatibility of the polyvinyl alcohol), various commercially available amine or amine-aldehyde resins, etc. Also, a number of cellulose derivative film-formers may be used, and these include the various water-soluble cellulose ethers, carboxymethylcellulose, hydroxypropylmethylcellulose, etc. Essentially these materials are photoinsensitive and their principal function is that of forming the desired film which will retain the dispersed phase in discrete particle form. Of the above materials, gelatin, casein, polyvinyl alcohol, gum arabic, starch, alkali metal carboxymethylcellulose (e.g., sodium carboxymethylcellulose) and hydroxyethylcellulose are particularly useful in this invention.

The use of nitrogen-containing compounds as part of the photosensitive combination is also described in detail in our above-mentioned prior applications, as well as in several of the above-cited patents. When an N-vinyl compound is used in a non-solubilizing continuous phase, as in our applications, a complication arises which is solved by the present invention. In the environment of such a continuous phase the combination of organic halogen and N-vinyl compound is capable of undergoing two separate and distinct reactions on exposure to actinic light. In one reaction, in a negative-working mode, a colored material is formed in light-struck areas. In another reaction, in a positive-working mode, "colorless" polymer is thought to be first formed and subsequent blanket exposure to "stronger" light, forming a color in the initially non-light-struck areas, yields a positive-working image. These two reactions are competitive, the kinetics of which say that one or the other will predominate depending on the wavelength-intensity-exposure of light, with the "colorless" polymer-forming reaction occurring with "weaker" light. The result is that in the negative-working mode in fringe areas of exposure, especially where the exposure is by projection or in contact exposure where the contact is not exact and uniform, some polymeric reaction takes place; not enough reaction to form a line of demarcation between the image and non-image areas, but enough to form a protective polymeric coating around globules of material that are still photosensitive and capable of forming colored material. This same effect is also found when reproducing tonal images; those areas of the image which receive only a slight exposure to light tend to form polymeric coatings around globules of still photosensitive materials. Even in those areas which are not exposed to imaging light, if a heat-treatment is used to bring out the image, some polymer may form as a result of previous slight light exposure during preparation of the coating and handling of the coated paper. Thus, if extreme measures are not taken to exclude all traces of actinic light during preparation of the coated paper, exposure to such traces of light may be sufficient, on subsequent heat-treatment, to form a polymeric coating around still photosensitive material. These fringe, tonal and partially "exposed" areas are particularly difficult to desensitize as the polymeric coating is impenetrable by most desensitizing materials. The desensitizing material must be capable of some penetration into the thin polymeric encapsulating coating without adversely reacting with the colored portions of the image. Most materials that can effectively penetrate the polymeric phase react with the uncoated colored portion and discolor or bleach the image. This invention provides a desensitizing material which effectively stabilizes the image obtained in the negative mode without discoloration or bleaching.

In a particularly preferred method, the desensitizing compound is contained, in a desensitizing amount, as above, in a solution comprising substantial amounts of (1) water and (2) an organic solvent having significant miscibility in water. Such a solution is particularly adapted to enable the desensitizer to penetrate both the water-penetrable continuous phase and above-described polymeric encapsulating coating.

In this embodiment the choice of solvent depends on the particular desensitizer used and is preferably one in which the desensitizer is significantly soluble and which is itself miscible to a significant extent in water. A particularly preferred organic solvent is acetone as the desensitizers are generally significantly soluble in a miscible water-acetone solution. The solubility of the various desensitizers in other common solvents are, for the most part, known or can readily be determined by simple methods known to the art. In those cases where a particular desensitizer and a particular solvent is desired, but the solubility of the desensitizer in that solvent is not sufficient for purposes of this invention, then a second or even third organic solvent can be added; e.g., most of the desensitizers would have sufficient solubility in a mixture of acetone, ethanol or benzene; or methanol, ether and octane. The solvent ratios can be adjusted to afford proper solubility of the desensitizer in the aqueous solutions. Solvents useful in this invention include ethanol, methanol, isopropanol, ether, acetone, benzene, octane, glycerol, m-dioxane, p-dioxane, chloroform, acetic acid, ethyl acetate, carbon tetrachloride, carbon disulfide, dimethylsulfoxide, mixtures thereof, and the like. Acetone, the dioxanes and methanol are particularly suitable solvents.

In general, from about 5 to about 90 volume percent of water is added to the organic solvent; in any case, the amount of water present should be insufficient to cause substantial precipitation of the desensitizer from the solution. It is preferred to use at least 10 volume percent water.

In another method the desensitizing compound is contained in the recording medium itself, that is, it is incorporated into the binder or continuous phase along with the photosensitive combination. This method is particularly applicable where the photosensitive combination is substantially insoluble in the continuous phase, such as the dispersions described above, and where the continuous phase is penetrable by solvent in which the desensitizer has significant solubility. The desensitizer can be "activated" by immersing the recording medium into such solvent for a time sufficient to penetrate the continuous phase, from about a few seconds to about 5 minutes, whereupon the desensitizer is brought into intimate contact with the photosensitive material rendering it photo-insensitive. Suitable solvents include those enumerated above. Generally from about 0.1 to about 15 weight percent of desensitizer, based on the weight of the continuous phase, can be added.

Where the continuous phase is water penetrable, water can be supplied as above or by incorporation into the binder of a water-releasing agent which releases water on the application of heat. Suitable water-releasing agents include: sodium sulfate decahydrate (Glauber's salt, which loses 10 molecules of water at 100° C.); sodium tetraborate decahydrate (borax, which loses 8 molecules of water at 60° C.); potassium aluminum sulfate (kalinite, which loses 9 molecules of water at 64.5° C.); sodium orthophosphate monohydrogen, both dodecahydrate and heptahydrate (each of which loses 5 molecules of water at 35° C. and 48° C., respectively); lithium nitrate trihydrate (which loses 2.5 molecules of water at 29.9° C.); and the like. Other materials that can be used include sodium triphosphate, sodium metasilicate, sodium alginate, sugar, and the like. It is preferable to use a more unstable hydrate, even containing less available water rather than hydrate which loses more water but at a higher temperature, so as to avoid prolonged heating of the photographic medium. Generally, from about 0.5 to about 15 weight percent of water as water-releasing agent can be added, based on the weight of the continuous phase. In order to "activate" the desensitizer the recording medium containing the water-releasing agent can be heated to an appropriate temperature, by placing over a heated platen, or by exposure to infrared, or in any convenient manner, whereupon water is released which carries the desensitizer into intimate contact with the photosensitive material, rendering it photo-insensitive.

The desensitizer reacts with the photosensitive material to destroy its photosensitivity or by some means prevent the photo-reaction. It is, therefore, surprising that such compounds could be incorporated into the binder without seriously affecting the photosensitivity of the product, especially when they are incorporated at the dispersion stage of preparation. When the dispersion is obtained by violently agitating the photosensitive materials in the continuous phase, the desensitizer can be added after substantial dispersion. It is found that particularly good results are obtained if the photosensitive material or one of the components thereof is first dissolved in a solvent therefor, which may be only a small amount, and then dispersed in the continuous phase with consequent volatilization of solvent. In general, little agitation is needed when a solvent is so used. For example, when a combination of N-vinylcarbazole and carbon tetrabromide is used as the photosensitive material, the N-vinylcarbazole, the carbon tetrabromide, or both, can be dissolved in a small amount of acetone, added to a continuous phase of aqueous gelatin and stirred to form discrete globules of photosensitive material upon volatilization of acetone. The desensitizer can then be added. Products formed in such manner have substantially full photosensitivity until the desensitizer is "activated" as above. The preparation of dispersions by the foregoing methods is described in detail in the Yoshikazu Yamada and Thomas H. Garland application Ser. No. 481,759, referred to above. Further details and procedures for incorporating the desensitizer can be found in an application by Yoshikazu Yamada and Lester F. M. Storm, entitled "Photographic Compositions," filed concurrently herewith.

The processes of this invention are particularly suitable to desensitizing photosensitive combinations in which the organic halogen compound is selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto. Compounds of this preferred group are described in U.S. Pats. 3,042,515, 3,042,516 and 3,042,517 and the descriptions and disclosures of these patents are hereby incorporated by reference. Examples of suitable organic halogen compounds include bromotrichloromethane,
bromoform,
iodoform,
1,2,3,4-tetrabromobutane,
tribromoacetic acid,
2,2,2-tribromoethanol,
tetrachlorotetrahydronaphthalene,
1,1,1-tribromo-2-methyl-2-propanol,
carbon tetrachloride,
p-dichlorobenzene,
4-bromobiphenyl,
1-chloro-4-nitrobenzene,
p-bromoacetanilide,
2,4-dichlorophenol,
1,2,3,4-tetrachlorobenzene,
1,2,3,5-tetrachlorobenzene,
brominated polystyrene,
n-chlorosuccinimide,
n-bromosuccinimide,
2-chloroanthraquinone,
tetrabromophenolphthalein,
tetrabromo-o-cresol, and the like.

Particularly effective compounds include carbon tetrabromide, tribromochloromethane, dibromodichloromethane, tribromoacetic acid, pentabromoethane, hexachloroethane and hexabromoethane. In general, bromides are preferred.

Organic halogen compounds that are most particularly suitable with this invention have the formula $$Br—C—(X)(X')(X'')_n(CY_3)_{1-n}$$

wherein X, X' and X'' are halogens, each Y is independently selected from the group consisting of halogen, hydrogen, hydroxy, methyl and methylol, and $n$ is selected from 0 and 1, such that when $n$ is 0, X and X' are Br. Such compounds are more readily obtainable than others and yield better results.

In general, the weight ratios of the nitrogen-containing and halogen compound starting agents, (a) and (b) respectively, may vary widely, from a minimum practical weight ratio of (a):(b) of about 1:5 to a maximum ratio of about 50:1. If the proportion of halogen compound used is greater than that specified in the foregoing range, it is ordinarily found that no practical advantage is obtained, and, in general, the weight ratio of (a):(b) used is not below about 1:2, except in special situations wherein losses of a halogen compound (e.g., carbon tetrabromide) are contemplated prior to the actual use. Also, if the amount of halogen compound used is less than the minimum just specified, the combination may be inadequately photosensitive. When a combination of two or more organic halogen compounds is used in the practice of the instant invention in a continuous water penetrable phase, it has been found that advantages are obtained often in the use of weight ratios of 5:1 to about 20:1.

With regard to the relative weights of the solid compounds (a) and (b) in the dispersed phase compared to the solids (2) in the continuous phase, it is found that the solids weight ratio of (1):(2) is preferably about 1:2, but may range from a maximum practical ratio of about 5:1 to a practical minimum ratio of about 1:50. The continuous phase may be 100% "solids" in the sense that the entire system solidifies without any loss of water, but generally the solids-to-liquid ratio in the continuous phase is within the range of about 1:1 to about 1:30.

Preferably, also the dispersed phase particles are in the range of about 0.1 to about 20 microns, but the preferred range is about 0.3 to about 10 microns, with an average particle size preferably of about 3 to 4 microns.

Further descriptions and examples of nitrogen atom-containing compounds, organic halogen compounds, dispersing mediums and other facets of compositions that can be desensitized by our process are given in our application referred to above, the disclosure of which is hereby incorporated by reference.

The following examples illustrate various embodiments of this invention:

EXAMPLE 1

The following formulation was prepared and coated on vellum:

Gelatin—10 g.
Water—36 ml.
N-vinylcarbazole—2.5 g.
Carbon tetrabromide—0.75 g.
4-(p-dimethylaminostyryl)-quinoline (dye sensitizer)—2 mg.
Dow Corning antifoam D—6 drops
Triton X-100—2 drops
Formalin—1 drop The water was heated and the gelatin dissolved therein after which the remaining ingredients were added with strong agitation until uniform dispersion was achieved.

A coated sheet was exposed to a positive image from a Kodachrome transparency projected with a 300 w. Bell & Howell Headliner Projector (8-diameter enlargement) for 30 seconds and the image was developed with heat. The result was a negative print on paper, similar to a silver halide negative, the tone being reversed such that the light-struck areas were dark and the non-light-struck areas, light. The print was cut into three strips which were treated as follows:

Strip 1.—Left as is for a control.

Strip 2.—Immersed in water for 5 minutes, then dried.

Strip 3.—Immersed in 5% aqueous sodium metabisulfite ($Na_2S_2O_5$) solution for 5 minutes, then dried.

All strips were handled in the dark. When dry, the strips were tacked onto the same piece of board and brought out into room light (combination of fluorescent light and daylight) and left standing in room light. At the end of several weeks, the results were as follows:

Strip 1.—Background (areas which have seen no light or very little light in the initial imagewise exposure) had turned to a dark brown. Darkening of the background started within a day.

Strip 2.—Background had turned slightly brown and was uneven.

Strip 3.—No darkening in the background areas.

The above was repeated except that Rhodamine B was used in the coating formulation as dye sensitizer in place of 4-(p-dimethylaminostyryl)-quinoline. The results were essentially the same. The strip immersed in 5% aqueous $Na_2S_2O_5$ solution showed no darkening in the background areas after several weeks' standing under room light conditions. The strip immersed in water showed uneven light browning in the background areas.

EXAMPLE 2

A coated sheet was prepared as in Example 1. The sheet was exposed to an 8-diameter projection image from a microfilm negative in a 300 w. Bell & Howell Headliner Projector and the image developed with heat. The imaged vellum sheet was immersed in a 5% sodium metabisulfite solution for 5 minutes, then dried. The sheet was used as a master for making 50 diazo copies using an Ozalid Bambino diazo printer. The master was exposed to strong UV and heat in making the diazo copies but even after 50 diazo copies, the sheet showed no darkening in the background areas, demonstrating that the background had been effectively stabilized by the aqueous sodium metabisulfite solution treatment.

EXAMPLE 3

A negative image was produced on coated vellum according to the formulation and procedure given in Example 1. A strip cut from this sheet was immersed in a 5% aqueous potassium metabisulfite solution ($K_2S_2O_5$) for 5 minutes, dried, then brought out into room light. After several weeks' standing, the strip showed no darkening in the background areas.

EXAMPLE 4

Another strip taken from the sheet described in Example 3 was immersed in 5% aqueous potassium sulfite solution ($K_2SO_3$) for 5 minutes, dried, then brought out into room light. The treated strip showed no background darkening after several weeks' standing under ambient light.

EXAMPLE 5

A negative image was produced on coated vellum according to the formulation and procedure given in Example 1. Instead of immersing a strip from the sheet in the solution, a 5% aqueous solution of sodium metabisulfite ($Na_2S_2O_5$) was wiped over the strip with a cotton wad applicator. After drying, the strip was brought out into room light. After several weeks' standing, wiped background areas of the strip remained clean, showing no background darkening.

EXAMPLE 6

A coating mix was prepared according to the formulation described in Example 1 and applied to a coated paper stock. An image was prepared on the coated sheet according to the procedure given in Example 1. A strip from the exposed and developed sheet was wiped with a viscous solution prepared as follows: 10 g. of $Na_2S_2O_5$ were added to a 2% aqueous solution of polyvinyl alcohol (Elvanol 51–05). After drying, the wiped strip was brought into room light and allowed to stand. After several weeks' standing wiped areas of the strip remained clean, without darkening.

EXAMPLE 7

Another exposed strip from Example 6 was wiped with a viscous carboxymethylcellulose solution containing sodium metabisulfite prepared by adding 10 g. of $Na_2S_2O_5$ to a 2% aqueous solution of sodium carboxymethylcellulose. Wiped areas of the strip remained clean after several weeks' standing in room light.

EXAMPLE 8

The following formulation was prepared by the method of Example 1 and coated on vellum:

Gelatin—10 g.
Water—36 ml.
N-vinylcarbazole—5 g.
Dibromodichloromethane—2.5 g.
4-(p-dimethylaminostyryl)-quinoline—2 mg.
Dow Corning antifoam B—6 drops
Triton X–100—2 drops
Formalin—1 drop A coated sheet was exposed and processed to give a negative image according to the procedure given in Example 1. The print was cut into three strips which were treated as follows:

Strip 1.—Left as is for a control.
Strip 2.—Immersed in water for 5 minutes, then dried.
Strip 3.—Immersed in 5% aqueous $Na_2S_2O_5$ solution for 5 minutes, then dried.

The background areas in Strip 3 remained undarkened after several weeks' standing in room light. The background areas in Strips 1 and 2 darkened within a day.

EXAMPLE 9

A coated sheet prepared according to Example 1 was immersed in a 5% $Na_2S_2O_5$ solution for 5 minutes. The sheet was dried then exposed to a positive Kodachrome transparency projection, heated, then given a blanket exposure to a sunlamp and heated. The sheet was not photosensitive and gave no image demonstrating the effectiveness of treatment by this invention in destroying photosensitivity.

EXAMPLE 10

A coated sheet prepared according to Example 1 was exposed to a projected image from a microfilm negative. The exposed sheet was then immersed in 5% $Na_2S_2O_5$ solution and dried at low heat. When the sheet was dry, it was heated to develop the image. The developed positive print stood under room light for several weeks without showing any background darkening, demonstrating that the stabilization treatment can be carried out before image development without affecting the developability of the image.

EXAMPLE 11

The following coating formulation was prepared by the method of Example 1 and applied on vellum:

Gelatin—10 g.
Water—36 ml.
N-vinylcarbazole—2.5 g.
Pentabromoethane—1 g.
4-(p-dimethylaminostyryl)-quinoline—2 mg.
Dow Corning antifoam B—6 drops Triton X–100—2 drops
Formalin—1 drop The print was cut into three strips which were treated as follows:

(A) A coated strip was exposed for 3 minutes to a square beam from a Bausch & Lomb monochromator with a mercury arc source set at 360 m$\mu$. The image on the strip was developed with heat. This strip was left as is for control.

(B) Another coated strip was imaged by the procedure described in (A). The developed strip was immersed in water, then dried.

(C) Another coated strip was imaged by the procedure described in (A). The strip was immersed in 5% aqueous $Na_2S_2O_5$ solution, then dried.

The dried strips, along with the control strip, were brought out together into room light. After several weeks' standing, Strip C showed no background darkening. Strip A was solidly brown with the image almost obliterated. The background in Strip B was spotty with clear and light brown areas.

EXAMPLE 12

Following the procedure of Example 1, N - vinylcarbazole and carbon tetrabromide can be dispersed in continuous phases of casein, polyvinyl alcohol, gum arabic, starch, sodium carboxymethylcellulose and hydroxyethylcellulose. The formulations can be coated on paper and exposed and heated as in Example 1 to form negative-mode images thereon. The paper is cut into strips and separate strips of each formulation type can be dipped for 5 minutes into aqueous solutions containing 10 weight percent lithium sulfite, 0.1 weight percent sodium sulfite, 0.4 weight percent ammonium sulfite, 0.5 weight percent potassium bisulfite, 15 weight percent magnesium sulfite, 5 weight percent potassium metabisulfite, and 3 weight percent sodium bisulfite, to stabilize the image on each strip.

EXAMPLE 13

Following the procedure of Example 1, separate aqueous gelatin dispersions of N-vinylcarbazole and tribromochloromethane, pentabromoethane, hexachloroethane, bromotrichloromethane, p - dichlorobenzene and 2,2,2-tribromoethanol can be coated on paper, exposed and heated to form negative-mode images thereon. The papers can be immersed in a 5% aqueous sodium metabisulfite solution for 3 minutes to stabilize the image on each sheet.

EXAMPLE 14

Following the procedure of Example 1, separate aqueous gelatin dispersions of carbon tetrabromide and N-ethylcarbazole, indole, diphenylamine, benzothiazoline and benzoxazoline, can be coated on paper, exposed and heated to form negative-mode images thereon. The papers can be immersed in a 7% aqueous potassium metabisulfite solution for 10 minutes to stabilize the image on each sheet.

EXAMPLE 15

Separate aqueous gelatin dispersions of carbon tetrabromide and N-vinylcarbazole can be prepared and coated on baryta paper following the procedure of Example 1. The coated sheets can be exposed to an 8× projected positive Kodachrome image (Bell & Howell slide projector 300 watt lamp) at 3 feet, for 10 seconds, left at room temperature for 15 minutes to enable a colorless polymer image to form, exposed for 1 second with a sun lamp at 7.5 inches and then developed for 1 hour at 140° C. to obtain positive mode photographs. The photographs can be immersed for 5 minutes in the following aqueous-organic solvent solutions containing 3 weight percent sodium metabisulfite: a 50:50 weight percent solution of methanol:water, a 30:70 weight percent solution of acetone: water, a 5:55:40 weight percent solution of benzene: ethanol:water, a 40:50:10 weight percent solution of methanol:ether:water, a 5:40:55 weight percent solution of p-dioxane:acetone:water and a 10:60:30 weight percent solution of m-dioxane:methanol:water, to desensitize the image on each sheet.

EXAMPLE 16

A formulation can be prepared following the procedure of Example 1, but which additionally contains 4 grams of sodium metabisulfite, added subsequent to dispersion of the N-vinylcarbazole and carbon tetrabromide. The formulation can be coated on paper and exposed and heated as in Example 1 to yield a negative mode image. By immersing the paper in water for about 1 minute, the background areas can be desensitized so as to retard darkening upon prolonged exposure to light.

EXAMPLE 17

A formulation can be prepared as in Example 16 but which additionally contains 4 grams of lithium nitrate trihydrate, sodium orthophosphate dodecahydrate, borax, kalinite, or Glauber's salt. The sheet can be exposed as in Example 16, but then heated for 5 minutes at 35° C., 48° C., 64° C., 70° C. or 100° C., respectively, to yield records with backgrounds that resist darkening.

With each of the above formulations, prior to heating, an overcoating of Scotch tape, or other flexible, transparent, water-impermeable material, can be applied to retain moisture and enhance desensitization.

It will be understood that modifications and variations may be effected without departing from the scope of the novel concepts of the present invention.

We claim:

1. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying a solution of a stabilizing amount of amt pound having the formula $M_{3-v-w}(H)_wS_{1+x}O_{3+2x}$ wherein $x$ is selected from 0 and 1, M is a cation selected from ammonium, alkali metals and alkaline earth metals, $v$ is the valence of said selected cation, and $w$ is 0 when $v$ is 2 and is selected from 0 and 1 when $v$ is 1.

2. The improvement of claim 1 wherein said compound is selected from ammonium, lithium, sodium, potassium and magnesium sulfites, potassium and sodium metabisulfites and ammonium, potassium and sodium bisulfites.

3. The improvement of claim 1 in which said stabilizing amount comprises at least 0.1 weight percent of said solution.

4. The improvement of claim 1 wherein said organic halogen compound is selected from the group consisting of carbon tetrabromide, tribromochloromethane, dibromodichloromethane, tribromoacetic acid, pentabromoethane, hexachloroethane and hexabromoethane.

5. The improvement of claim 1 wherein the nitrogen-atom containing compound is an N-vinyl compound.

6. The improvement of claim 1 wherein said nitrogen atom-containing compound is selected from the group consisting of N-vinylcarbazole, N-ethylcarbazole, indole and diphenylamine.

7. The improvement of claim 6 wherein said binder is selected from the group consisting of gelatin, casein, polyvinyl alcohol, gum arabic, starch, alkali metal carboxymethylcellulose and hydroxyethylcelluose.

8. The improvement of claim 6 in which said stabilizing amount comprises from about 0.1 to about 15 weight percent of said solution.

9. A transparency suitable for use as an image mask for an actinic light source in a photographic reproduction process, which comprises a photographic image in a solid film forming hydrophilic binder on a translucent carrier formed by exposure to actinic light of a photosensitive combination in said binder of:

(a) an organic halogen compound selected from the group of compounds which produce free radicals or ions upon exposure to light of a suitable wave length and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, wherein image and background areas have been stabilized by applying thereto a solution of a stabilizing amount of a compound having the formula $M_{3-v-w}(H)_wS_{1+x}O_{3+2x}$ wherein $x$ is selected from 0 and 1, M is a cation selected from ammonium, alkali metals and alkaline earth metals, $v$ is the valence of said selected cation, and $w$ is 0 when $v$ is 2 and is selected from 0 when $v$ is 1.

10. The transparency of claim 9 in which said stabilizing amount comprises at least 0.1 weight percent of said solution.

11. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying a solution comprising substantial amounts of (1) water and (2) an organic solvent miscible with water, said solution containing a stabilizing amount of a compound having the formula $M_{3-v-w}(H)_wS_{1+x}O_{3+2x}$ wherein $x$ is selected from 0 and 1, M is a cation selected from ammonium, alkali metals and alkaline earth metals, $v$ is the valence of said selected cation, and $w$ is 0 when $v$ is 2 and is selected from 0 when $v$ is 1.

12. The improvement of claim 11 in which said stabilizing amount comprises at least 0.1 weight percent of said solution.

References Cited

UNITED STATES PATENTS

| | | | |
|---|---|---|---|
| 3,255,013 | 6/1966 | Dersch et al. | 96—67 X |
| 3,374,094 | 3/1968 | Warner | 96—67 X |

NORMAN G. TORCHIN, Primary Examiner

R. E. FICHTER, Assistant Examiner

U.S. Cl. X.R.

96—90